(12) United States Patent
Lee

(10) Patent No.: US 7,142,807 B2
(45) Date of Patent: Nov. 28, 2006

(54) METHOD OF PROVIDING KARAOKE SERVICE TO MOBILE TERMINALS USING A WIRELESS CONNECTION BETWEEN THE MOBILE TERMINALS

(75) Inventor: Ju-Byung Lee, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 215 days.

(21) Appl. No.: 10/761,970

(22) Filed: Jan. 21, 2004

(65) Prior Publication Data
US 2004/0162062 A1    Aug. 19, 2004

(30) Foreign Application Priority Data
Feb. 13, 2003 (KR) .................. 10-2003-0008989

(51) Int. Cl.
*H04H 1/00* (2006.01)
(52) U.S. Cl. ............... 455/3.01; 455/66.1; 455/556.1; 455/151.2; 455/518; 455/519; 434/307; 84/609
(58) Field of Classification Search ............... 455/3.01, 455/3.03, 3.06, 66.1, 556.1, 151.2, 518, 519; 434/307; 84/609
See application file for complete search history.

(56) References Cited

U.S. PATENT DOCUMENTS

| | | | | |
|---|---|---|---|---|
| 5,588,842 A | * | 12/1996 | Nishimura et al. | 434/307 A |
| 5,689,081 A | * | 11/1997 | Tsurumi | 84/609 |
| 5,691,494 A | * | 11/1997 | Sai et al. | 84/609 |
| 5,824,934 A | * | 10/1998 | Tsurumi et al. | 84/609 |
| 5,885,085 A | * | 3/1999 | Fujita | 434/307 A |
| 6,062,868 A | * | 5/2000 | Toriumi | 434/307 A |
| 6,074,215 A | * | 6/2000 | Tsurumi | 434/307 A |
| RE37,131 E | * | 4/2001 | Mankovitz | 455/66 |

FOREIGN PATENT DOCUMENTS

JP      2000122671     *   4/2000

* cited by examiner

Primary Examiner—Steven M. D'Agosta
(74) Attorney, Agent, or Firm—Dilworth & Barrese LLP

(57) ABSTRACT

A method of providing a Karaoke service to mobile terminals through wireless connection between them. The mobile terminals are grouped as a service group and one of them is designated as a master mobile terminal and the other mobile terminals as slave mobile terminals. The master mobile terminal is connected to a Karaoke service provider through a mobile communication network and controls service content to be received from the Karaoke service provider in all the mobile terminals of the service group. If the master mobile terminal transmits a play command to the slave mobile terminals, all the mobile terminals start to play Karaoke music according to the service contents.

15 Claims, 3 Drawing Sheets

METHOD OF PROVIDING KARAOKE SERVICE TO MOBILE TERMINALS USING A WIRELESS CONNECTION BETWEEN THE MOBILE TERMINALS

PRIORITY

This application claims priority under 35 U.S.C. § 119 to an application entitled "Method of Providing Karaoke Service to Mobile Terminals Using Wireless Connection between the Mobile Terminals" filed in the Korean Industrial Property Office on Feb. 13, 2003 and assigned Serial No. 2003-8989, the contents of which are incorporated herein by reference.

BACKGROUND OF THE INVENTION

1. Field of the Invention

The present invention relates generally to a method of providing a service through a mobile terminal, and in particular, to a method of providing a Karaoke service to a mobile terminal, and providing a computer-readable recording medium to record a program thereon for performing the Karaoke service method.

2. Description of the Related Art

Due to its portability and convenience, the mobile terminal has emerged as a necessity in daily living. Commonly, mobile terminals are equipped with a variety of functions including phonebook and scheduler. Accordingly, they serve as a personal information manager in addition to a means for making phone calls. $2.5^{th}$ generation mobile terminals, based on IS (International Standard)-95C, and $3^{rd}$ generation mobile terminals such as IMT (International Mobile Communication)-2000 terminals provide additional multimedia service for personal entertainment purposes.

A Karaoke function, a type of personal entertainment service, plays songs across various genres with lyrics and animation through a mobile terminal. FIG. 1 illustrates a mobile communication system for providing a conventional Karaoke service. Referring to FIG. 1, the Karaoke service is provided over a typical mobile communication network. Hence, the Karaoke service is provided directly from a service provider (SP) over the mobile communication network rather than a service from the mobile communication network itself.

The mobile communication system is comprised of a mobile terminal 11 for receiving the Karaoke service over the mobile communication network, a home location register (HLR) 12 and an authentication center (AC) 13 for providing the registration information of the mobile terminal 11, a mobile communication network 14 for connecting SPs to users, and a Karaoke SP 15 for providing the Karaoke service.

In operation, the user of the mobile terminal 11 selects an intended song and requests its audio data from the Karaoke SP 15 through the mobile communication network 14. The Karaoke SP 15 then authenticates the user through the HLR 12 and the AC 13 and provides the audio data stored in its database to the user. The mobile terminal 11 plays the song with its lyric displayed using the received audio data, enabling the user to sing along.

In general, a user enjoys Karaoke music with others rather than alone. The volume of music that a single mobile terminal plays depends on its speaker and is usually not loud enough for a plurality of users to enjoy the music. In addition, no matter how good the speaker is, it cannot offer enough volume for them with the single sound source.

In view of diverse voice services and rapid changes in their formats, the Karaoke SP 15 attempts to attract mobile subscribers with new features such as accompaniment with multichannel surround sound effects including stereo, or accompaniment with higher-note polyphonic sound through the existing mobile terminal limited to a 40-note polyphonic sound capacity. However, with the service deployment depending on the performance of an individual mobile terminal in the conventional technology, the benefits of those services are often elusive.

SUMMARY OF THE INVENTION

It is, therefore, an object of the present invention to provide a Karaoke service method using wireless connections between mobile terminals that are equipped with a Karaoke function, for playing music accompaniment concurrently through the mobile terminals by synchronizing them, and a computer-readable recording medium for recording a program thereon for performing the Karaoke service.

It is another object of the present invention to provide a Karaoke service method for playing music with a high volume, surround sound effects, and various sound sources.

The above and other objects are achieved by providing a method of providing a Karaoke service to a mobile terminal through wireless connections, and a computer-readable recording medium having a program thereon to perform the Karaoke service.

According to one aspect of the present invention, in the Karaoke service method, the mobile terminal is grouped as a service group with mobile terminals having a wireless connection function to receive the Karaoke service. One of the mobile terminals is designated as a master mobile terminal and the other mobile terminals are designated as slave mobile terminals. The mobile terminal designated as the master mobile terminal is connected to a Karaoke service provider through a mobile communication network and controls service contents to be received from the Karaoke service provider in all the mobile terminals of the service group. The master mobile terminal transmits a play command to the slave mobile terminals, and all the mobile terminals start to play Karaoke music according to the service contents.

According to another aspect of the present invention, in the Karaoke service method, a mobile terminal is grouped in a service group with mobile terminals to receive the Karaoke service and designated as a master or slave mobile terminal in the service group. If the mobile terminal is designated as a slave mobile terminal, the mobile terminal receives service contents from a Karaoke service provider under the control of the master mobile terminal. Upon receiving a play command from a master mobile terminal, it starts to play Karaoke music according to the service contents.

According to a further aspect of the present invention, a computer-readable recording medium has a program recorded thereon to perform first, second, and third functions in a mobile terminal having a processor. In the first function, a mobile terminal is grouped in a service group with mobile terminals having a wireless connection function to receive the Karaoke service. One of the mobile terminals is designated as a master mobile terminal and the other mobile terminals are designated as slave mobile terminals. The mobile terminal designated as the master mobile terminal in the first function is connected to a Karaoke service provider through a mobile communication network and controls service contents to be received from the Karaoke service provider in all the mobile terminals of the service group in the second function. The master mobile terminal transmits a play command to the slave mobile terminals, and then all the mobile terminals start to play Karaoke music according to the service contents in the third function.

According to still another aspect o the present invention, a computer-readable recording medium has a program recorded thereon to perform first, second, and third functions in a mobile terminal having a processor. The program performs first, second, and third functions. In the first function, the mobile terminal is grouped in a service group with mobile terminals to receive the Karaoke service and is designated as a master or slave mobile terminal in the service group. If the mobile terminal is designated as a slave mobile terminal, the mobile terminal receives service contents from a Karaoke service provider under the control of the master mobile terminal in the second function. Upon receiving a play command from the master mobile terminal, a slave mobile terminal starts to play Karaoke music according to the service contents in the third function.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described in detail herein below with reference to the accompanying drawings. In the following description, well-known functions and constructions are not described in detail since they would obscure the invention in unnecessary detail.

Figure 1:
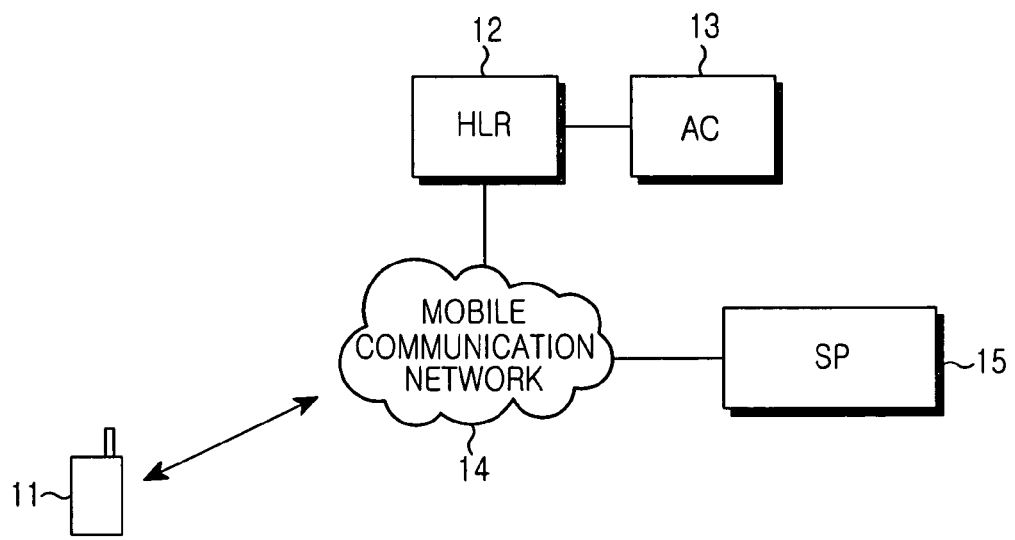
FIG. 1 illustrates a mobile communication system that provides a conventional Karaoke service to a mobile terminal.
Figure 2:
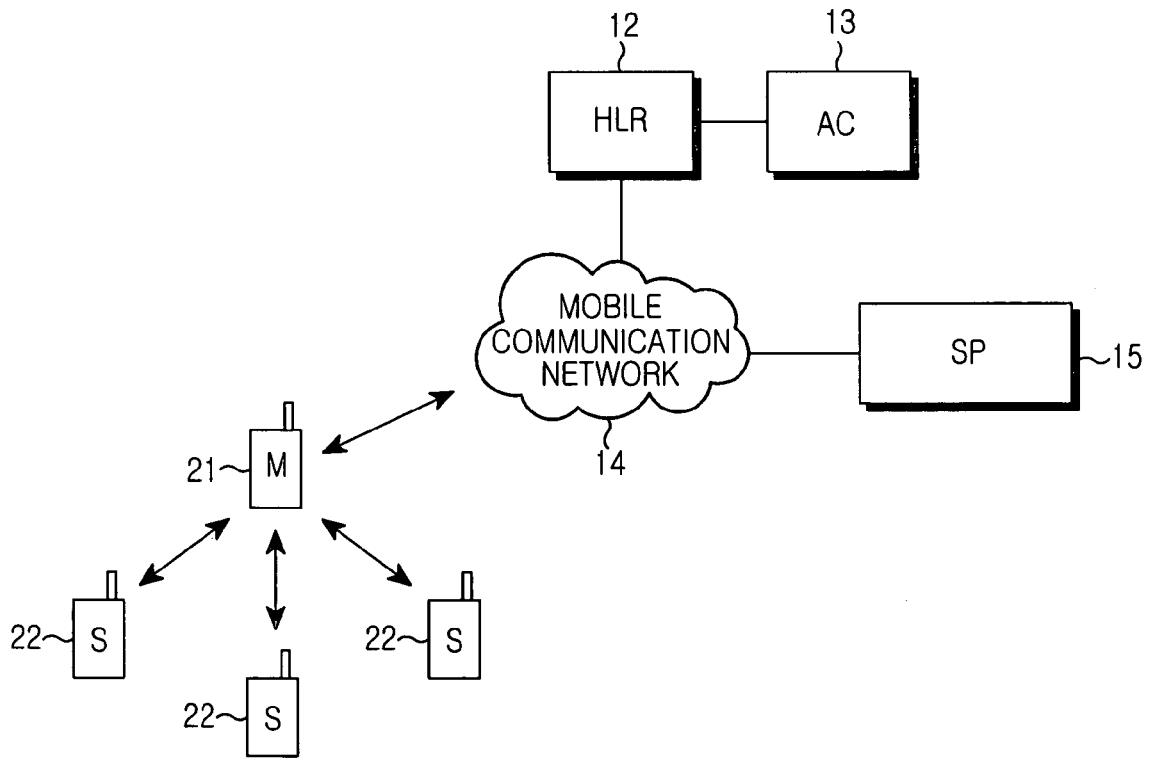
FIG. 2 illustrates the configuration of a mobile communication system that provides a Karaoke service to a plurality of mobile terminals through wireless connections between them according to an embodiment of the present invention.

FIG. 2 illustrates a mobile communication system for providing a Karaoke service to mobile terminals through wireless connections between them according to an embodiment of the present invention. Referring to FIG. 2, the mobile communication system is comprised of a master mobile terminal 21 that receives the Karaoke service over a mobile communication network 14, slave mobile terminals 22 connected to the master mobile terminal 21, for receiving the same Karaoke service, the HLR 12 and the SC 13 for providing registration information for the mobile terminals 21 and 22, the mobile communication network 14 for connecting SPs to mobile subscribers, and a Karaoke SP 15 for providing a Karaoke service.

In operation, the master mobile terminal 21 is connected to the slave mobile terminals 22, forming a service group. The user of the master mobile terminal 21 selects an intended song and requests its audio data from the Karaoke SP 15 through the mobile communication network 14. The Karaoke SP 15 authenticates the user through the HLR 12 and the AC 13 and transmits the audio data to the master mobile terminal 21 and the slave mobile terminals 22. When the master mobile terminal 21 transmits a play command to the slave mobile terminals 22, the master and slave mobile terminals 21 and 22 start to simultaneously play the song, displaying its lyrics using the audio data, enabling users sing along.

This method of providing the Karaoke service to mobile terminals by synchronizing them will be described below with reference to FIG. 3.

Figure 3:
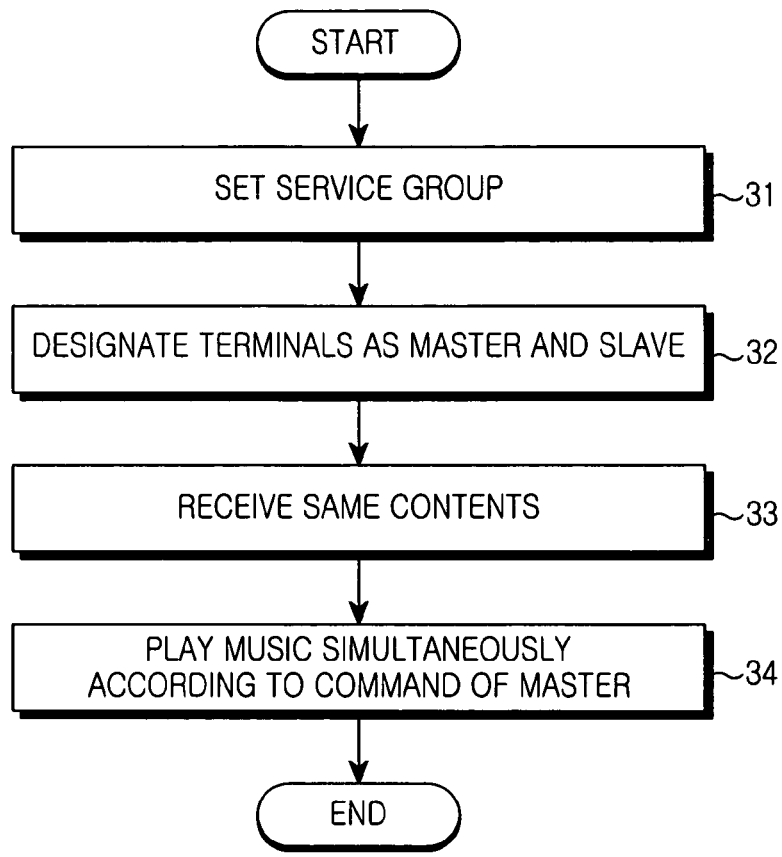
FIG. 3 is a flowchart illustrating an operation for providing the Karaoke service to mobile terminals through wireless connections between them according to the embodiment of the present invention.

FIG. 3 is a flowchart illustrating an operation for providing the Karaoke service to mobile terminals through wireless connections between them according to the embodiment of the present invention. Referring to FIG. 3, the mobile terminals equipped with the functions of wireless Internet browsing, Karaoke music playing, and wireless connection are grouped in a service group in step 31. The wireless connections refer to connections between mobile terminals by Bluetooth, IRDA (Infrared Data Association), or wireless LAN (Local Area Network). The service group, corresponding to a working group in a PC (Personal Computer) network, is set by assigning the same wireless connection address to the mobile terminals. Thus, interference from other mobile terminals having a different wireless connection address is avoided.

In step 32, one of the mobile terminals in the service group is designated as a mater mobile terminal with the other mobile terminals designated as slave terminals. The designation of master and slave MT's will be described in more detail hereinbelow with reference to FIG. 4.

Figure 4:
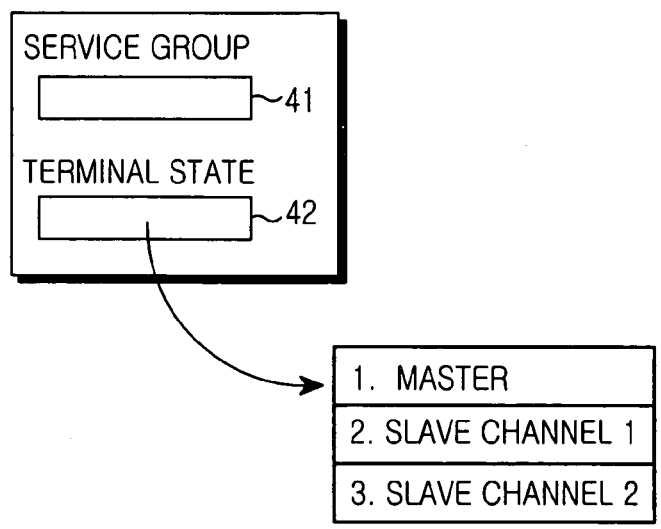
FIG. 4 illustrates examples of screen displays in a mobile terminal for receiving the Karaoke service through wireless connection with other mobile terminals according to the embodiment of the present invention.

FIG. 4 illustrates examples of screen displays related to the Karaoke service in a mobile terminal according to the embodiment of the present invention. Referring to FIG. 4, a service group window 41 displays a wireless connection address assigned commonly to mobile terminals in the same service group, and a mobile terminal state window 42 displays the state of the mobile terminal, i.e., master or slave.

To provide the Karaoke service in various modes, a slave grouping can be further divided into a slave channel 1, a slave channel 2, etc. If the Karaoke SP provides multichannel sound, that is, the audio is divided into discrete channels, center, left front, right front, left rear, and right rear, slave channel 1 outputs one of the channels such as the right channel for stereo sound or the left rear channel for digital surround sound 5.1, slave channel 2 outputs another channel, and the other channels output their respective channel sound. When sound from multiple sound sources is divided into 16- to 40-note polyphonic sounds, each channel may output its assigned sounds.

The mobile terminal state is set to "master" only for a master mobile terminal. The master mobile terminal can remotely control the Internet and Karaoke functions of the slave mobile terminals through the wireless connections between them.

Returning to FIG. 3, after the master mobile terminal 21 selects a song and requests the song from the Karaoke SP 15 through the mobile communication network 14, the master and slave mobile terminals 21 and 22 receive service contents related to the song from the Karaoke SP 15 in step 33. The contents reception is carried out in two ways, which will be described later with reference to FIGS. 5A and 5B.

When the master mobile terminal 21 sends a play command to the slave mobile terminals 22 through wireless connection, for example, by Bluetooth, IRDA, or wireless LAN, all the mobile terminals 21 and 22 in the service group start to play the song simultaneously, synchronized according to a pilot channel clock signal in step 34.

Upon request for a call setup for any mobile terminal in the service group during the music accompaniment playing, the mobile terminal is released from synchronization and connected to a call. The call setup request acts as an interrupt to the Karaoke service.

Figure 5A:
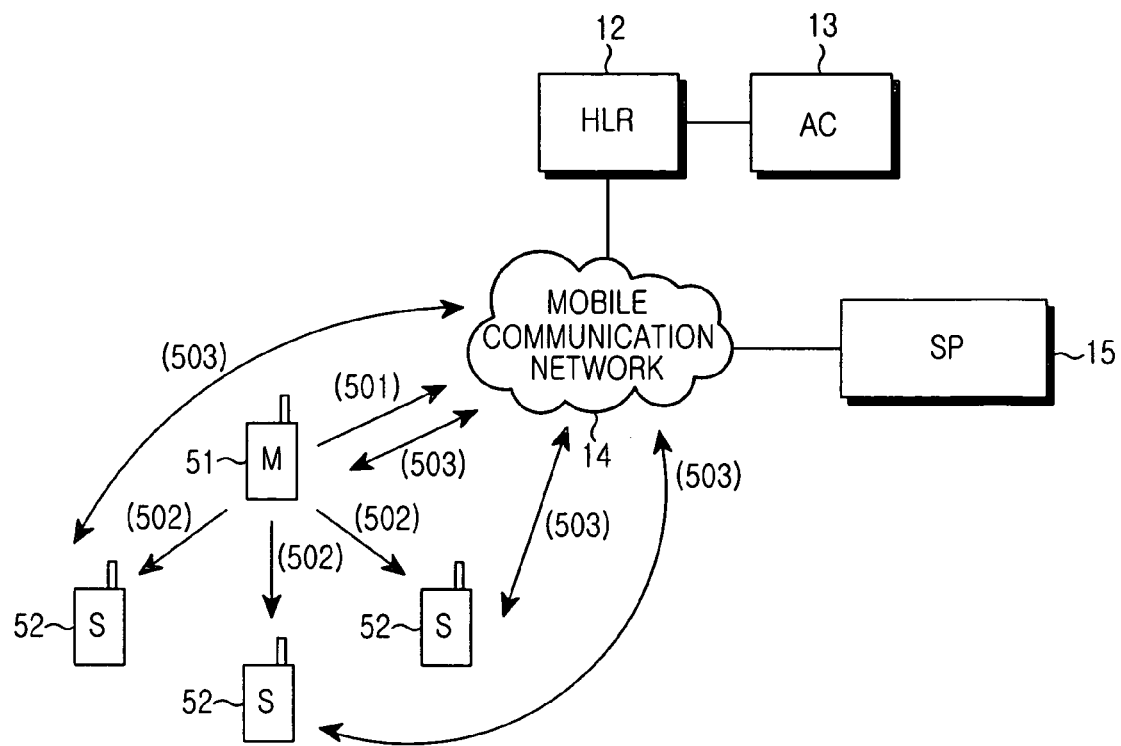
FIGS. 5A and 5B illustrate embodiments of contents reception for the Karaoke service through wireless connections with other mobile terminals according to the present invention.
Figure 5B:
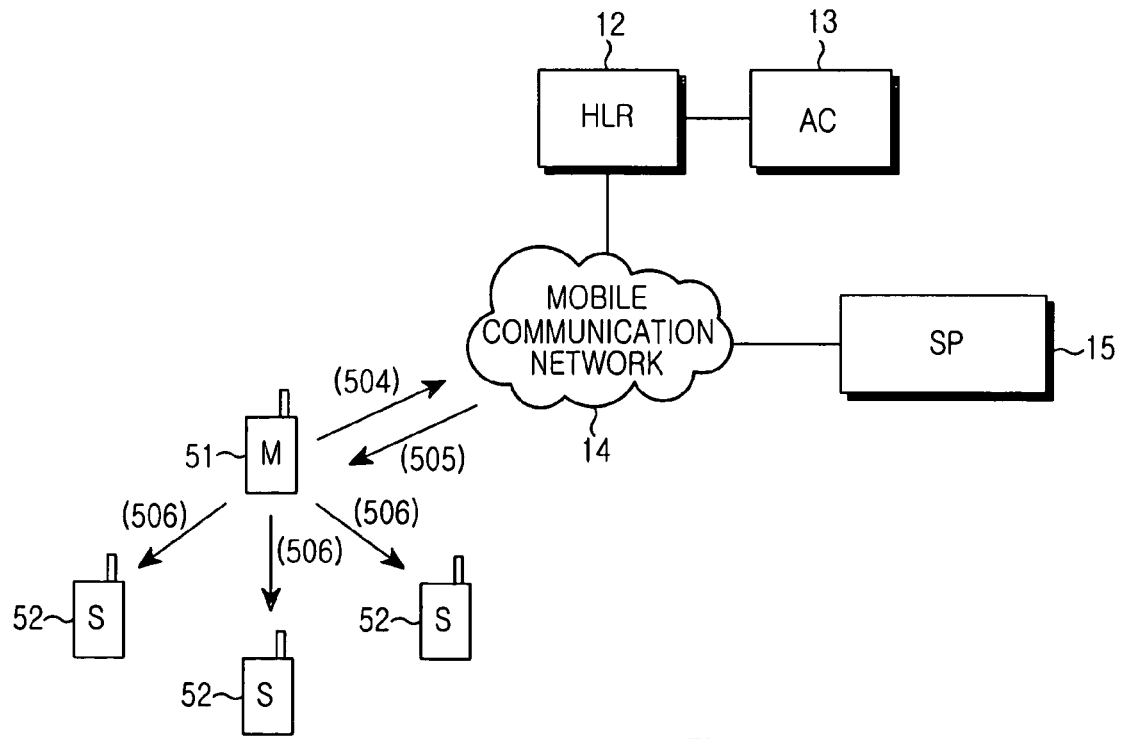

FIGS. 5A and 5B illustrate embodiments of the contents reception in the Karaoke service using wireless connection between mobile terminals according to the present invention. Referring to FIG. 5A, a mobile terminal 51 is designated as a master and mobile terminals 52 are designated as slaves in a service group. After the service group is set in step 31 and the master and slave mobile terminals 51 and 52 are designated in step 32, the mobile terminals 51 and 52 receive service contents (i.e., Karaoke audio data) from the Karaoke SP 15 in step 33 in FIG. 4.

Describing step 33 in more detail, the master mobile terminal 51 selects a song from a music database in the Karaoke SP 15 through the mobile communication network 14 in step 501 and transmits a contents receive command to the slave mobile terminals 52 in step 502. Since the master mobile terminal 51 can remotely control the wireless Internet function of the slave mobile terminals 52, the master mobile terminal 51 and the slave mobile terminals 52 under the control of the master mobile terminal 51 receive the same service contents in step 503.

Referring to FIG. 5B, describing step 33 in more detail, the master mobile terminal 51 selects a song from a music database in step 504 and receives receive service contents from the Karaoke SP 15 through the mobile communication network 14 in step 505. The master mobile terminal 51 then transmits the service contents to the slave mobile terminals by wireless connection in step 506.

The contents receiving method illustrated in FIG. 5A enables each mobile terminal to receive a different channel or a different sound source since master and slave mobile terminals all access the Karaoke SP. If the SP prohibits content duplication and reproduction, retransmission of the service contents from the master mobile terminal to the slave mobile terminals is not permitted. In this sense, the method of FIG. 5A is useful. When accessing the SP, each slave mobile terminal transmits a packet indicating a slave channel to receive corresponding channel contents.

Alternatively, rates for using service contents are saved and the same data can be broadcast to mobile terminals in the same service group in the content receiving method illustrated in FIG. 5B.

As described above, the present invention offers the following benefits: (1) provision of Karaoke music with high volume, surround sound effects, and multiple sound sources improves the quality of the Karaoke service; (2) since a plurality of mobile terminals download the same audio data from an SP and users enjoy the Karaoke service through their mobile terminals together rather than alone, the number of service connections is increased and the novel service deployment attracts more customers from an SP's point of view; (3) the extension of the use of wireless data communication between mobile terminals enables mobile terminal manufacturers to create new customer demands; and (4) a program for carrying out the Karaoke service can be written on a computer-readable recording medium (e.g., CD ROM, RAM, floppy disk, hard disk, and optomagnetic disk).

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of providing a Karaoke service to a mobile terminal through a wireless connection, comprising the steps of:
grouping the mobile terminal with mobile terminals having a wireless connection function to receive the Karaoke service together as a service group;
designating one of the mobile terminals as a master mobile terminal;
designating all other mobile terminals as slave mobile terminals;
connecting the master mobile terminal to a Karaoke service provider through a mobile communication network and controlling service content to be received from the
Karaoke service provider in all the mobile terminals of the service group; and playing Karaoke music according to the service content by all the mobile terminals in the service group when the master mobile terminal transmits a play command to the slave mobile terminals, wherein the master and slave mobile terminals are synchronized according to a pilot channel clock signal for simultaneously playing in the playing step.

2. The method of claim 1, wherein the wireless connection is carried out by one of Bluetooth, IRDA (Infrared Data Association), and wireless LAN (Local Area Network).

3. The method of claim 1, further comprising the step of, when a call connection is attempted for the mobile terminal, releasing the mobile terminal from the service group and connecting a call to the mobile terminal.

4. The method of claim 1, wherein the step of controlling the service content to be received comprises the steps of:
searching for the service content from the Karaoke service provider;
transmitting information about the service content to the slave mobile terminals in the service group; and
receiving the service content from the Karaoke service provider according to the service content information in the master mobile terminal and the slave mobile terminals to receive.

5. The method of claim 1, wherein the step of controlling the service content comprises the steps of:
searching for the service content from the Karaoke service provider;
receiving the service content from the Karaoke service provider in the master mobile terminal; and
transmitting the service content from the master mobile terminal to the slave mobile terminals by wireless connections between the master mobile terminal and the slave mobile terminals.

6. A method of providing a Kraoke service to a mobile terminal through a wireless connection, comprising the steps of:
grouping the mobile terminal with mobile terminals to receive the Karaoke service together as a service group;
designating one of the mobile terminals as a master mobile terminal;

designating the other mobile terminals as slave mobile terminals;

receiving, in the slave mobile terminals, service contents from a Karaoke service provider under control of the master mobile terminal; and playing Karaoke music according to the service contents if the slave mobile terminals receive a play command from the master mobile terminal, wherein the master and the slave mobile terminals are synchronized according to a pilot channel clock signal for simultaneously playing in the playing step.

7. The method of claim 6, wherein the wireless connection is carried out by one of Bluetooth, IRDA (Infrared Data Association), and wireless LAN (Local Area Network).

8. The method of claim 6, further comprising the step of, when a call connection is attempted for the mobile terminal, releasing the mobile terminal from the service group and connecting a call to the mobile terminal.

9. The method of claim 6, wherein the step of receiving the service contents, comprises the steps of:

transmitting information about the service contents from the Karaoke service provider to the slave mobile terminals through the master mobile terminal; and connecting the slave mobile terminals to the Karaoke service provider and transmitting the service contents to the slave mobile terminal.

10. The method of claim 6, wherein the slave mobile terminals receive the service contents from the master mobile terminal by the wireless connection.

11. The method of claim 6, wherein the slave mobile terminals are further grouped as a predetermined number of sub-service groups according to a number of channels.

12. The method of claim 11, wherein each of the sub-service groups receives different sound data and plays Karaoke music according to the sound data.

13. The method of claim 12, wherein the sound data is from one of a left channel and a right channel for stereo sound.

14. The method of claim 12, wherein the sound data is from one of channels for digital surround sound 5.1.

15. The method of claim 12, wherein the sound data is from one of a predetermined number of sound sources divided from multiple sound sources.

* * * * *